US006546044B1

(12) United States Patent
Dent

(10) Patent No.: US 6,546,044 B1
(45) Date of Patent: Apr. 8, 2003

(54) DUAL-MODE RADIOTELEPHONE APPARATUS FOR DIGITAL OR ANALOG MODULATION

(75) Inventor: Paul W. Dent, Pittsboro, NC (US)

(73) Assignee: Ericsson Inc., Research Triangle Park, NC (US)

(*) Notice: Subject to any disclaimer, the term of this patent is extended or adjusted under 35 U.S.C. 154(b) by 1029 days.

(21) Appl. No.: 08/730,670

(22) Filed: Oct. 11, 1996

(51) Int. Cl.$^{7}$ .................................................. H04L 25/00

(52) U.S. Cl. ......................... 375/216; 375/298; 332/103

(58) Field of Search ................................. 375/216, 298, 375/281; 332/103, 119

(56) References Cited

U.S. PATENT DOCUMENTS

| | | | | |
|---|---|---|---|---|
| 4,737,968 A | | 4/1988 | Norton et al. | 375/60 |
| 5,020,076 A | | 5/1991 | Cahill et al. | |
| 5,048,059 A | | 9/1991 | Dent | |
| 5,095,288 A | | 3/1992 | Dent | |
| 5,163,159 A | | 11/1992 | Rich et al. | 455/74 |
| 5,180,993 A | | 1/1993 | Dent | |
| 5,228,074 A | * | 7/1993 | Mizikovsky | 455/88 |
| 5,446,422 A | * | 8/1995 | Mattila et al. | 375/216 |
| 5,530,722 A | * | 6/1996 | Dent | 375/298 |
| 5,642,378 A | * | 6/1997 | Denheyer et al. | 375/216 |
| 5,745,523 A | * | 4/1998 | Dent et al. | 375/216 |

FOREIGN PATENT DOCUMENTS

| | | | |
|---|---|---|---|
| EP | 0 502 546 | 9/1992 | H04B/1/40 |
| GB | 2 247 368 | 2/1992 | H03C/3/00 |

* cited by examiner

*Primary Examiner*—Temesghen Ghebretinsae
(74) *Attorney, Agent, or Firm*—Myers Bigel Sibley & Sajovec, P.A.

(57) ABSTRACT

A dual-mode radiotelephone capable of operation in analog or digital modes. According to exemplary embodiments, a digital signal processor receives a speech signal to be transmitted in the digital or analog mode and generates In-phase (I) and Quadrature (Q) modulating signals. The I and Q signals are supplied to a quadrature modulator for generating a digitally modulated signal and are supplied to an analog modulator for generating an analog modulated signal.

31 Claims, 5 Drawing Sheets

EAR
MIC
KEYBOARD
DISPLAY
RINGER
INDICATOR LED'S
T/R
DIGITAL SIGNAL PROCESSING, CONTROL PROCESSOR AND D-TO-A'S AND A-TO-D'S
FIRST IF FILTERS
IF AMPLIFIERS
AFC
SYNTH CONTROL
ANALOG MODULATION INPUT
FREQUENCY SYNTHESIZER
FRONT END
L.O.
1900 MHz
800 MHz
TRANSMIT SECTION
LPF
COS
SIN
DUPLEXER
NF REF
F REF
EN1
EN2

ANALOG MODULATED SIGNAL AT TXIF(A)
ANALOG MODULATOR
26
SELECT OR COMBINE
24
Q̄
Q
Ī
I
D.S.P. SECTION
25
COS (TXIF(D))
22a
BALANCED LPF
21a
D TO A
DIGITAL SIGNAL PROCESSOR LOGIC
DIGITALLY MODULATED SIGNAL AT TXIF(D)
23
27a
27b
BALANCED LPF
D TO A
22b
21b
20
SIN (TXIF(D))
QUADRATURE MODULATOR
17

TO LOGPOLAR DSP
6MHz
RSSI
2ND IF
34
2ND LO
33
36
35
SELECT
1ST IF FILTERS
37
72MHz
38
72.06 MHz
13 MHz
16
14
DUAL BAND FRONT END
VCO CONTROL VOLTAGE
1ST LO SIGNAL
42
30
31
X6
32
X2
78 MHz
156 MHz
28
0
π/2
COS
SIN
27a
27b
I Ī
Q Q̄
23
25
TXIF(D)
50
51
52
53
54
55
LO1
TXIF(A)
117.06 MHz
61
62
63
64
65
I OR Q
40
÷78 OR ÷325
1MHz OR 240KHz
41
FRACTIONAL N SYNTH CIRCUIT
43
AUX. SYNTH
18

TO/FROM DSP (17)
(OPTIONAL SPEEDUP)
OUTPUT TO 1900 MHz TRANSMIT ANTENNA CONNECTION
156 MHz QVCO
COS
SIN
LPF
VCO
BUFFER
PA
EW 1900
EW 800
LO FROM FRONT END (14)
78MHz TO IF AMP (16)
÷2
÷6
13 MHz
13 MHz REFERENCE
AUX. SYNTH
DIVIDE BY 1951
240 KHz
÷4
OUTPUT TO 800 MHz TRANSMIT ANTENNA PORT

DUAL-MODE RADIOTELEPHONE APPARATUS FOR DIGITAL OR ANALOG MODULATION

FIELD OF THE INVENTION

The present invention generally relates to radio transmitters capable of both digital and analog modulation for impressing information on the transmitted signal, and in particular to personal portable communications devices such as cellular phones using frequency modulation or quadrature modulation.

BACKGROUND OF THE INVENTION

In U.S. Pat. No. 5,745,523, filed Oct. 27, 1992, the entirety of which is incorporated herein by reference, a dual mode radio apparatus having both a digital information transmission mode and an analog transmission mode is described. The modulation in either the digital or analog mode is applied by first computing In-phase (I) and Quadrature (Q) signals representative of the desired modulated signal vector and applying the I,Q signals through I and Q D/A converters to a quadrature modulator.

U.S. Pat. No. 5,020,076 to Cahill discloses a hybrid modulation apparatus that in a digital modulation mode applies I,Q modulation to a quadrature modulator, and in an analog modulation mode applies an analog frequency modulation waveform to a phase lock loop to generate a signal which is then passed straight through an I,Q modulator which is biased with constant I,Q signals.

It would be desirable to generate the analog modulation waveform needed in the Cahill method by using a digital signal processor employed for digital modulation to compute a sampled digital representation of the analog modulation waveform, and then converting the digital representation to the required analog modulation waveform using either the I D/A converter or the Q converter or both.

It would further be desirable for an analog modulation implementation to avoid the Cahill technique of passing the modulated signal through a permanently-biased I,Q modulator, since the Cahill method may sometimes result in a digital modulation frequency which is undesirable for analog modulation.

SUMMARY OF THE INVENTION

The present invention is directed toward a transmitter/receiver, such as a radiotelephone, which is capable of operating in two modes. In a first mode, the transmitter signal is modulated with digital information. Specifically, a digital signal processor computes sampled digital representations having a real or In-phase waveform (I) and an imaginary or Quadrature waveform (Q).

After digital-to-analog conversion in respective I and Q D/A converters, a quadrature modulator impresses the I,Q signals on an intermediate radio frequency. The intermediate frequency is subsequently upconverted to a desired transmission frequency by a local oscillator signal from the radiotelephone receiver.

In a second mode, the transmitter signal is modulated with an analog signal. Specifically, the digital signal processor forms the analog signal by computing a sampled digital representation of the analog modulation signal. The sampled digital representation is converted to an analog waveform using either or both of the I or the Q D/A converter, and applied to an analog modulator to produce an analog modulated radio signal that may be at a second intermediate frequency. This second intermediate frequency signal is subsequently converted to the desired transmission frequency with the aid of a local oscillator signal from the radiotelephone receiver.

In a preferred implementation, both the digital modulation and the analog modulation are constant envelope modulations that vary only the signal's phase angle. A preferred method of transferring the desired angle modulation to the desired transmission frequency is to use a voltage-controlled oscillator to produce a signal at the desired transmission frequency and mix the signal with a local oscillator signal from the receiver to produce an intermediate frequency signal. The intermediate frequency signal is phase-compared with either a modulated or unmodulated reference signal to produce a feedback signal to control the oscillator to follow the desired angle modulation waveform. The feedback loop bandwidth is furthermore adapted according to the modulation mode selected either to follow digital modulation on the reference signal or not to follow analog modulation applied to the voltage controlled oscillator.

BRIEF DESCRIPTION OF THE DRAWINGS

The invention will be more readily understood upon reading the following Detailed Description of the Preferred Embodiments in conjunction with the accompanying drawings, in which like reference indicia indicate like elements, and in which.

DETAILED DESCRIPTION OF THE PREFERRED EMBODIMENTS

Figure 1:
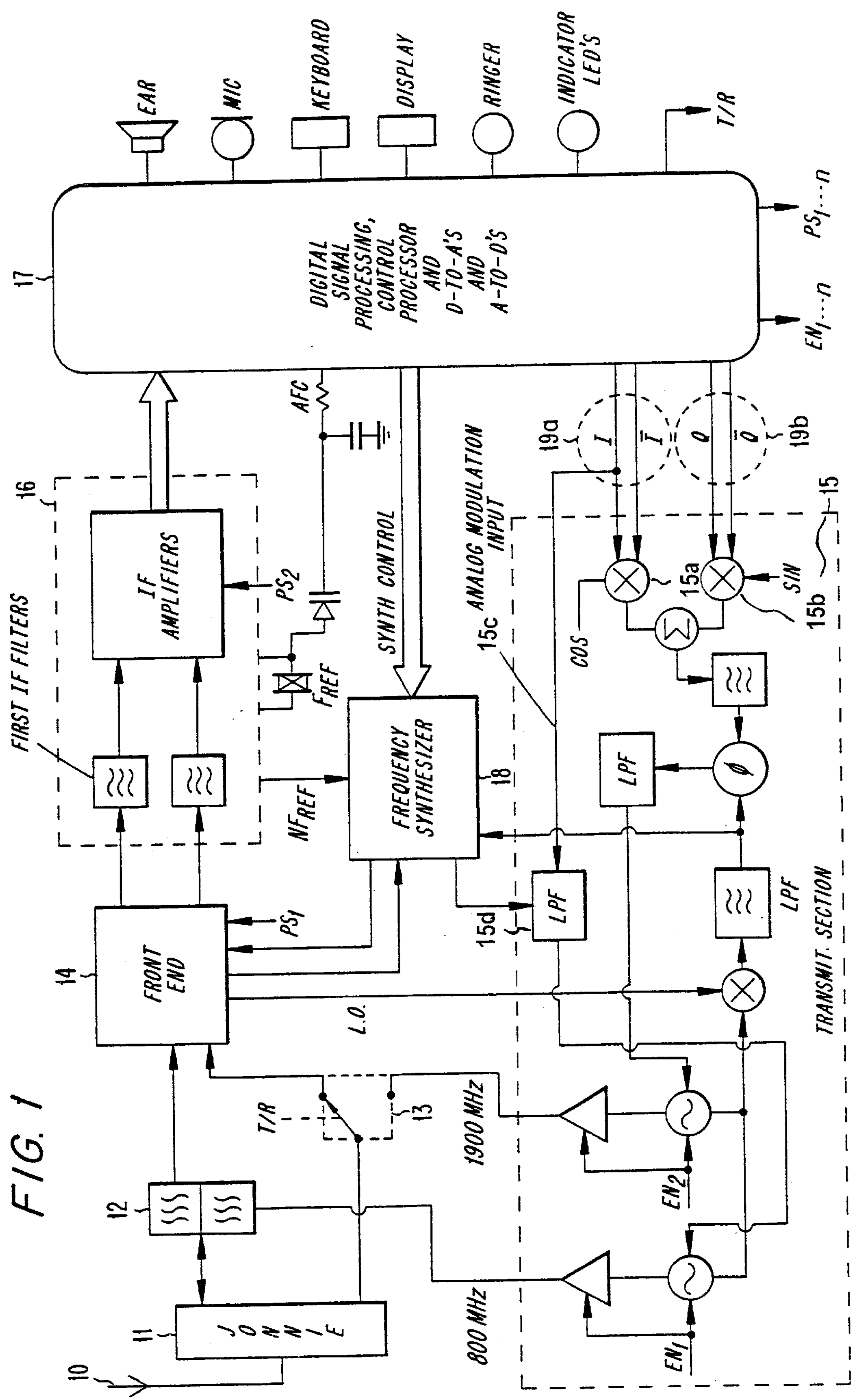
FIG. 1 is a block diagram of an exemplary dual-mode radiotelephone according to the present invention.

Referring to FIG. 1, a dual-mode radiotelephone according to an exemplary embodiment of the present invention is shown. The dual-mode apparatus of FIG. 1 is suitable for selectively producing analog modulation when operating in a first frequency band or digital modulation when operating in a second frequency band. For example, the first frequency band may be an 800 MHz cellular band in which the analog modulation conforms to the U.S. AMPS standard while the second frequency band may be the 1900 MHz "PCS" band recently licensed by the FCC, which employs digital modulation according to the GSM standard.

A dual band 800/1900 MHz antenna 10 operates at both frequency bands. A band-splitting filter 11 separates signals in the two frequency bands for application to a diplexing filter 12 for the 800 MHz AMPS bands and a transmission/reception (T/R) switch 13 for the 1900 MHz band in which time-duplex is preferably employed. The signals output from diplexing filter 12 and T/R switch 13 are applied to the inputs of a receiver front-end 14 for amplification and downconversion to a suitable intermediate frequency or frequencies. The intermediate frequency signals are filtered and amplified in intermediate frequency processor 16 and may be digitized for digital signal processing in DSP 17. A suitable digitizing method is the logpolar digitizing technique described in U.S. Pat. No. 5,048,059, the entirety of which is incorporated herein by reference. Front-end 14 includes one or more local oscillators to provide mixing frequencies for downconversion, and outputs one or more local oscillator signals for use in the transmitter 15. The local oscillator signal frequency is controlled by frequency synthesizer 18 which is controllably programmed according to the selected channel frequency. The synthesizer preferably operates according to U.S. Pat. Nos. 5,095,288 and 5,180,993 which are hereby incorporated by reference and provides a fast locking capability from power up or on channel change to implement the standby power saving features described in U.S. Pat. No. 5,568,513 (Harte, Dent, Croft and Solve), filed May 11, 1993, which is also incorporated herein by reference. The synthesizer 18 may also contain circuits coupled to transmitter 15 for controlling the transmit intermediate frequency.

Transmitter 15 provides transmit power outputs at the analog and digital frequency bands. These outputs are fed to antenna 10 via diplexing filter 12 or T/R switch 13 respectively. T/R switch 13 is controlled by DSP and control processor 17 to allow either transmission or reception of TDMA signal bursts in an alternating manner known as Time Duplex. Transmitter 15 also receives either analog or digital modulation waveforms respectively from DSP 17 via the I-waveform connection 19*a* or the Q waveform connection 19*b*.

I-waveform modulation connection 19*a* preferably supplies balanced I signals to transmitter 15 via two lines labelled I and $\bar{I}$ in FIG. 1. Likewise, the Q-waveform modulation connection 19*b* preferably supplies balanced Q signals to transmitter 15 via Q and Q. These signals are preferably generated by an I,Q modulator such as the one disclosed in U.S. Pat. No. 5,530,722 (Dent, filed Sep. 14, 1994) which is a continuation-in-part of U.S. Pat. No. 5,745,523 and is incorporated herein by reference in its entirety. U.S. Pat. Application No. 5,530,722 discloses the use of digital converters to generate balanced I/Q signals from a stream of binary words that numerically represent sampled I/Q waveforms, and high bitrate streams of single-bit samples and their complements, wherein the desired I or Q value is represented by the ratio of binary 1's to binary 0's in a stream. This allows the analog waveforms and their inverses to be recovered simply by low-pass filters, without the use of additional D/A converters.

The balanced, analog I,Q waveforms supplied to transmitter 15 are then fed to a quadrature modulator composed of an I modulator 15*a* and a Q modulator 15*b* to generate respectively a cosine waveform and a sine waveform at an intermediate transmit frequency TXIF. The I,Q modulator is preferably performed in transmitter 15, while the cos/sin TXIF signal generation may be contained in the transmitter 15 or alternatively in the receiver section 16, which will be described in more detail below with reference to FIG. 3.

As described in U.S. Pat. No. 5,745,523, the balanced I,Q waveforms represent digital information modulated in a digital transmission mode, or alternatively represent analog frequency modulation in the analog mode. It will be appreciated that the analog mode may conform to the U.S. AMPS standard or indeed any analog FM cellular standard including the British ETACS or Scandinavian NMT systems, all of which employ companding to compress amplitude variations of speech into a reduced dynamic range.

According to the present invention, an alternative analog modulation mode employing the I,Q modulation lines 19*a* and 19*b* from DSP section 17 can be achieved, wherein the analog modulation is not applied to the I,Q modulator but to a separate analog modulator. FIG. 1 shows an exemplary embodiment wherein the analog modulator is formed by combining one of the I,Q signals (here the I signal) supplied over an analog modulation input line 15*c* with a phase lock feedback signal from synthesizer 18 in a loop filter 15*d*. The choice to use the I signal is arbitrary, as the $\bar{I}$ signal or one of the Q signals or both or all could be combined with the phase lock feedback signal in order to achieve analog frequency modulation. The choice of frequency modulation is also arbitrary and amplitude modulation could alternatively be used. The principle of the present invention is illustrated more generally in FIG. 2.

Figure 2:
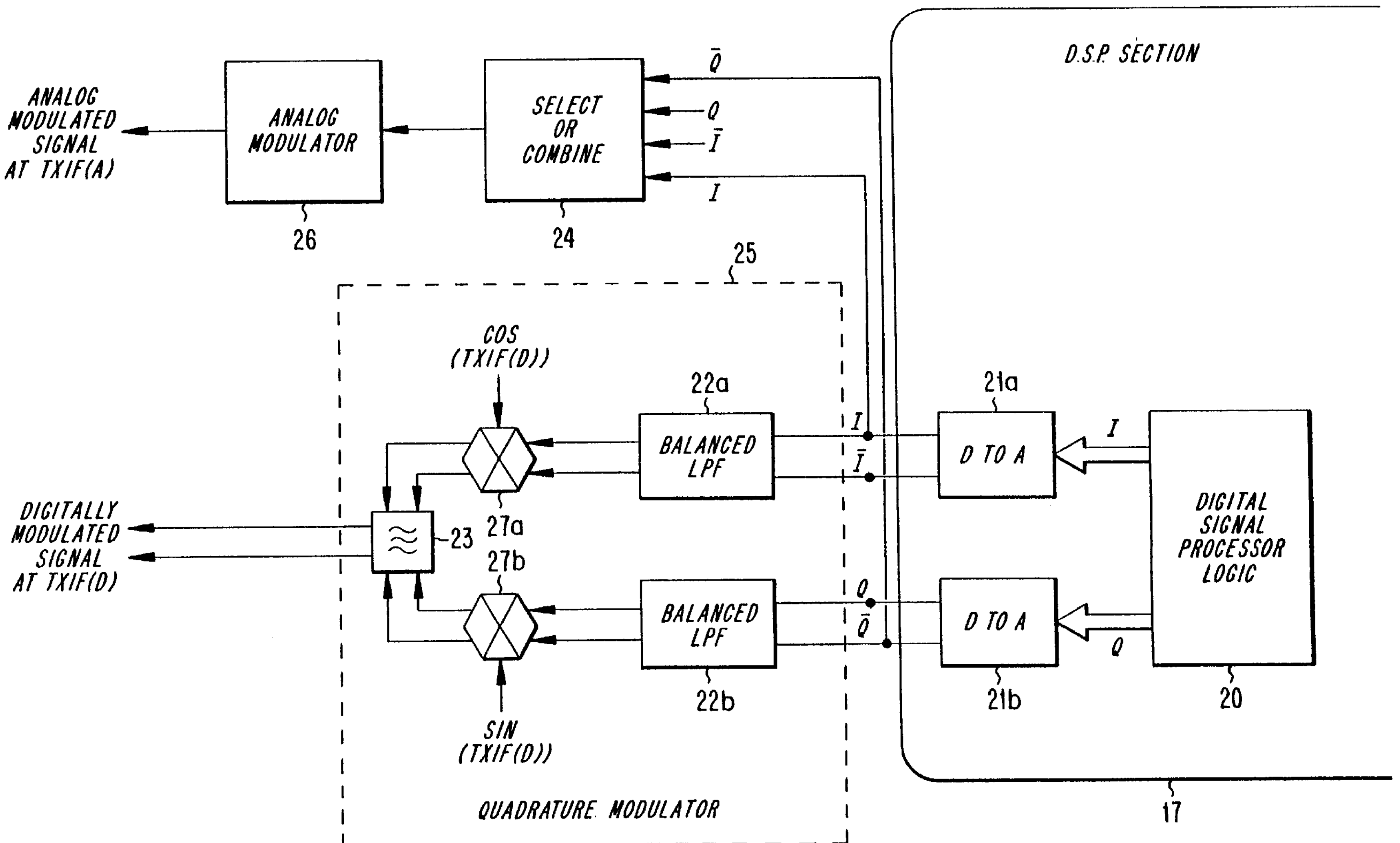
FIG. 2 is a block diagram of an exemplary quadrature modulator suitable for use in the radiotelephone of FIG. 1.

Referring to FIG. 2, it can be seen that DSP 17 includes digital signal processor logic 20 for computing either a sampled numerical I,Q representation of a digital modulation waveform or a sampled numerical representation of an analog modulation waveform. The result of the computation is applied to at least one of D/A converters 21*a* and 21*b* which preferably operate by converting an input to a high bitrate delta-sigma modulation signal and then low-pass filtering the signal in one of balanced low-pass filters 22*a* and 22*b* as disclosed in the patent applications referenced above. The D/A converted, balanced waveforms are applied to balanced modulators 27*a* and 27*b* which modulate respectively a cosine and a sine waveform at a first transmit frequency or an intermediate frequency TXIF(D) that is desired for the digital modulation mode. The digital modulation mode can be, for example, a GSM mode in which a speech encoder compresses the bitrate and thus the occupied transmission bandwidth for digital speech for transmission using time-duplex TDMA in the 1900 MHz PCS band; the modulation would be 270–833 kilobits per second for the GSM mode.

If the digitally modulated signal is first generated at an intermediate transmit frequency by quadrature modulator 25, it is upconverted to the desired final transmit frequency using an upconverter. For constant amplitude modulation schemes such as GMSK, only the phase of the signal is modulated and must be transferred to the output frequency, which can be performed by a phase lock loop as will be described-below with reference to FIG. 4.

FIG. 2 further shows that the I,Q signals produced by D/A converters 21*a* and 21*b* can be supplied via select/combine unit 24 to analog modulator 26 to produce an analog modulated signal at a desired frequency TXIF(A) for analog modulation. TXIF(A) can be either the desired transmission frequency or an intermediate transmit frequency signal, which is upconverted to the desired transmission frequency as will be described later with reference to FIG. 4. Select/combine unit 24 can be simply a hardwired connection between one of the I,$\bar{I}$,Q or $\bar{Q}$ signals and modulator 26, but can alternatively combine the I and $\bar{I}$ (or Q and $\bar{Q}$) signals in a balanced to unbalanced converter, or perform more sophisticated combining of an I signal representing the coarse part of an analog modulation waveform with a Q signal representing the error between the coarse representation and the ideal waveform, in order to achieve a reduction in quantizing noise. Another method of combining separate I and Q signals to produce a desired modulation would be two-point frequency modulation of a frequency synthesizer, wherein one of the I or Q signals is used to frequency modulate a voltage controlled oscillator (VCO) while the other signal is injected into the synthesizer loop controlling the VCO to counteract the loop's tendency to correct the first signal's modulation of the VCO. Still another method of using I and Q signals to produce an analog modulated signal would include frequency modulating the signal with one of I or Q waveforms while using the other to determine the amplitude of transmission.

Any of the above methods of selecting one or more of the I,Q signals or using them in combination to effect analog modulation while bypassing the quadrature modulator 25 can be implemented in the present invention.

Figure 3:
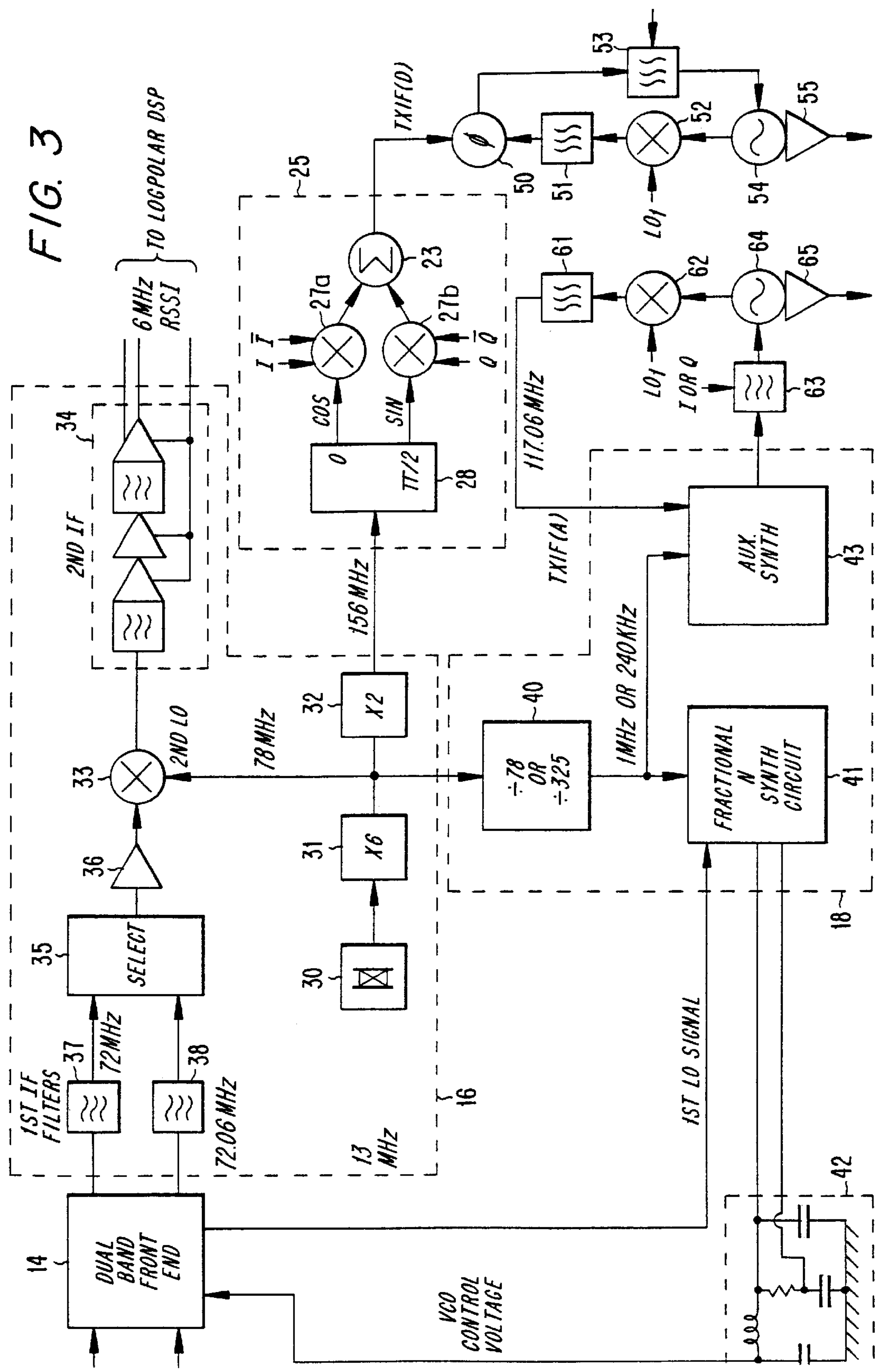
FIG. 3 is a block diagram showing an exemplary frequency assignment scheme in the radiotelephone of FIG. 1.

Referring now to FIG. 3, an exemplary frequency plan for a dual-band, dual-mode apparatus according to an embodiment of the invention is shown. To further enhance the present invention, as many components as possible are reused in both bands or modes in order to achieve the most economical design. In particular, it is desirable to employ a dual-frequency antenna (10 of FIG. 1), synthesizer 18, IF amplifier 16 etc. for both modes.

One problem in employing a single synthesizer 18 to provide both a first local oscillator frequency and to assist in generating the transmit frequency is that the duplex spacing (the frequency difference between transmit-receive frequency pairs) may not be the same in the digital and analog modulation mode, or in the 800 MHz cellular band compared to the 1900 MHz PCS band. The synthesizer 18 produces a local oscillator frequency (L01) that is higher (for example) than the receive channel frequency Frx by the desired first intermediate frequency IF1. To use the same value of L01 to produce the transmit frequency when operating in the same band (800 MHz or 1900 MHz) the apparatus must include means to offset L01 by an amount TXIF(A or D) to produce the desired transmit channel frequency Ftx. It can readily be seen that $$Ftx = L01 - TXIF$$

$$Frx = L01 - IF1$$

Therefore DUPLEX SPACING=Frx−Ftx=TXIF−IF1 or alternatively TXIF=IF1+DUPLEX SPACING.

If substantially the same frequency IF1 is to be used in both modes, but the duplex spacing is different, then TXIF (A) in one mode will not be the same as TXIF(D) in the other mode. This hinders the use of the same I,Q modulator for modulation in both modes, as it may be difficult to produce an I,Q modulator that performs well at both TXIF(A) and TXIF(D). The actual duplex spacings are 45 MHz in the 800 MHz band and 80 MHz in the 1900 MHz band. Therefore TXIF(A) and TXIF(D) will differ by approximately 80−45=35 MHz if the same IF1 is to be used. It would of course be possible to configure a design which uses the same TXIF in both bands and modes, by instead allowing different IF1s. However, this hinders the use of common components in the receive path and increases cost and complexity. The preferred arrangement uses values of IF1 that are the same or nearly the same in both modes, thus allowing TXIF(A) and TXIF(D) to be separately adapted to produce the desired duplex spacings. This is facilitated by the invention which provides an economic way to perform analog modulation using a TXIF(A) that is different from the TXIF(D) employed by the quadrature modulator 25 for digital modulation.

FIG. 3 shows a preferred frequency plan based on a 13 MHz reference oscillator. 13 MHz is the basis for deriving the GSM bitrate (13 MHz/48) and the GSM channel spacing (13 MHz/65) in the 1900 MHz band. To obtain 30 KHz channel steps in the 800 MHz band, synthesizer 18 needs a reference frequency that is a multiple of 30 KHz, and preferably a multiple of 8×30 KHz in order to provide fast channel changing time and low phase noise by use of the fractional-N technique of incorporated U.S. Pat. No. 5,180,993. Neither 30 KHz nor 240 KHz divides into 13 MHz, but this problem is solved by multiplying the frequency from reference oscillator 30 by six in frequency multiplier 31 to obtain 78 MHz, which is 325 times 240 KHz. 78 MHz is also a convenient second local oscillator frequency for mixing signals at the chosen first IF frequency of 72 MHz down to a second intermediate frequency of 6 MHz in second mixer 33. The 6 MHz signal is then further amplified and filtered in second IF 34 to produce an output for digitizing and processing in DSP 17. The choice of second intermediate filter equal to 6 MHz allows the use of existing off-the-shelf filters available at that frequency, but it will be appreciated that other suitable frequencies may be chosen.

In the time-duplex TDMA digital mode (GSM at 1900 MHz), the duplex spacing is 80 MHz, which requires a TXIF(D) equal to IF1 (=72 MHz) plus 80 MHz, or 152 MHz. By further frequency doubling the 2nd local oscillator signal L02 from 78 MHz to 156 MHz, a useable TXIF(D) is obtained. The 4 MHz discrepancy between 152 and 156 MHz can be accommodated because transmission and reception do not take place at the same time. Therefore, using a fast switching synthesizer 18, the value of L01 may be changed 4 MHz between reception and transmission. To facilitate this, the phase comparator reference frequency used by synthesizer 18 in the digital mode is 1 MHz, derived by dividing the 78 MHz signal by 78 in reference divider 40. Fractional-N synthesizer circuit 41 then further interpolates by a factor of 5 to obtain the desired 200 KHz steps of GSM. In the analog mode, 30 KHz steps are obtained by first dividing 78 MHz by 325 in reference divider 40, then interpolating by a factor of 8 using the fractional-N synthesizer 41. Synthesizer 18 is appropriately programmed for these different modes and channel frequencies by control signals sent from control processor of DSP 17.

The frequency multipliers used to produce 78 MHz and 156 MHz can employ phase lock loops that divide an oscillator running at the desired frequency by 6 or 12 to produce a 13 MHz signal which is compared with the 13 MHz signal from oscillator 30 to produce a feedback control signal to control the oscillator to the desired multiple. For example, a 156 MHz signal can be produced in this manner and a 78 MHz signal can be derived from an intermediate divide-by-2 output of the loop divide-by-12 circuit.

The 156 MHz signal is modulated by digital information in the digital mode by I,Q modulator 25, which includes quadrature network 28 to generate cosine and sine waveforms. The modulated signal at TXIF(D) (=156 MHz) is then upconverted to the desired 1900 MHz band in the following manner applicable to constant envelope modulations: Voltage Controlled Oscillator 54 operates at the desired output frequency to drive transmit power amplifier 55. The output signal from oscillator 54 is mixed with the receive local oscillator signal L01 which has been sidestepped 4 MHz as described above during the transmit burst. The resulting signal after low pass filtering in filter 51 is at TXIF(D) and is phase compared in comparator 50 with the I,Q modulated signal at TXIF(D) from quadrature modulator 25. Comparator 50 generates a phase error signal which, after loop filtering using an integrator in filter 53 produces a control signal coupled to VCO 54 that controls its phase to follow the modulation imposed on TXIF(D) by modulator 25. In this way, the phase modulation is transferred to the transmit frequency.

In analog mode however, IF1 is chosen to be 72.06 MHz. This choice of an IF1 for analog mode that is nearly the same as for digital mode; however, the same IF1 of 72 MHz could have been chosen, or alternatively 71.94 MHz. Small differences such as 60 KHz in IF1 between analog and digital mode do not prejudice the use of the same 6 MHz IF amplifier 34 as its filter bandwidth is sufficiently broad to encompass 5.94 MHz as well as 6 MHz or 6.06 MHz.

The duplex spacing of 45 MHz in the 800 MHz band leads to a TXIF(A) equal to 72.06+45=117.06 MHz. This is a multiple (×1951) of 60 KHz and may easily be produced using auxiliary synthesizer 43, sharing reference divider 40 with main synthesizer 41. The auxiliary synthesizer may further divide the 240 KHz reference signal by 4 to obtain the desired 60 KHz reference signal, at which frequency it is phase-compared with the signal TXIF(A) divided by 1951.

An oscillator 64 running at the desired transmit frequency in the 800 MHz cellular band drives power amplifier 65 and is also coupled to mixer 62 where it is mixed against the receive local oscillator L01 operating at the appropriate frequency for reception in the 800 MHz band. The resulting signal at 117.06 MHz is applied, after low pass filtering in filter 61, to auxiliary synthesizer 43 where it is divided by 1951 to 60 KHz and phase compared to the 60 KHz reference signal to produce a phase error signal.

The phase error signal is filtered and integrated in loop filter 63 and then added to the selected I or Q or combined signal, the desired analog frequency modulating waveform to produce a control signal for oscillator 64. The control signal limits the oscillator 64 to the desired transmit channel frequency and modulates the oscillator 64 with the desired frequency modulation waveform.

It should be noted that while separate mixers 52,62, low-pass filters 51,61 and power amplifiers 55,65 are illustrated in FIG. 3, any or each pair can be combined to reduce complexity. For example, mixers 52 and 62 can be the same mixer, the selection of which is based on which of oscillators 54,64 was enabled to drive it. Had the value of IF1 for the analog mode been chosen instead to be 72 MHz, the value of TXIF(A) would be 117 MHz, which is 1950×60 KHz or 975×120 KHz. This would allow the choice of a 120 KHz phase-comparison frequency in the auxiliary synthesizer. Alternatively, the 117 MHz is nine times the 13 MHz reference crystal frequency, which can be generated using the same technique as for the 156 MHz TXIF(D). This would be a good choice if a quadrature modulator operating at both 117 MHz and 156 MHz used, together with I,Q modulation in analog mode. However, producing wideband I,Q modulators is difficult and costly, and therefore the exemplary embodiments of the present invention teach the use of one or more of the I,Q D/A converted signals as a conventional analog modulation signal applied to the auxiliary synthesizer loop. When the synthesizer loop is used to control a phase or frequency modulated signal, it is desirable to have a large division factor (1950) in the loop in order to reduce the amount of modulation reaching the phase comparator at 60 or 120 KHz. This is because a large phase error signal due to the modulation can cause distortion of the modulation frequency response or non-linear distortions due to non-linearities of the phase detector.

Thus, the exemplary frequency plan of FIG. 3 includes a range of options for the values of IF1 and TXIF(A) used in the analog modulation mode. The choice of IF1, in the analog mode to be 72.06 or 71.94 MHz can be useful also in the digital mode. According to the digital GSM standard, the cellular network radiates a special signal called the Frequency Correction Burst or Frequency Correction Channel (FCH) as part of the Broadcast Control Channel (BCCH). The FCH is an unmodulated TDMA burst. More precisely, the burst is modulated by an all-1's or all-0's pattern, which produces a CW carrier that is offset by ¼ of the bitrate, due to the characteristics of Gaussian Minimum Shift Keying modulation (GSMK). Since the bitrate is 13 MHz/48 (270.833 KB/s), the frequency is offset by +67.708 KHz. This is translated to the first intermediate frequency with a sign change if the receive local oscillator frequency L01 is greater than the receive frequency Frx. The FCH burst may be readily detected by using a narrow bandpass filter such as filter 38 of FIG. 3, centered on the offset frequency. Since the bandwidth of filter 38 is chosen to be approximately ±15 KHz for analog mode, it is approximately of the correct width to detect the FCH burst in digital mode, despite the selection of filter 38 to be centered on 72.06 with an FCH frequency of 72.067708 or 71.94 with an FCH of 71.932292 MHz. The error of +7.708 KHz is within the ±15 KHz bandwidth of the filter and so passes through to DSP 17 for detection. DSP 17 may digitally correct for the 7.708 KHz of error and may further reduce the bandwidth prior to detection. Detection can be performed by monitoring the signal energy out of the narrowband filtering to determine if it increases at the predefined FCH burst interval repetition rate compared to energy outside the FCH burst intervals. All possible interval timings can be explored. The timing which exhibits the greatest increase in narrowband energy is used to establish coarse TDMA network timing, and then other signal and message content are searched for in the BCCH signal.

Figure 4:
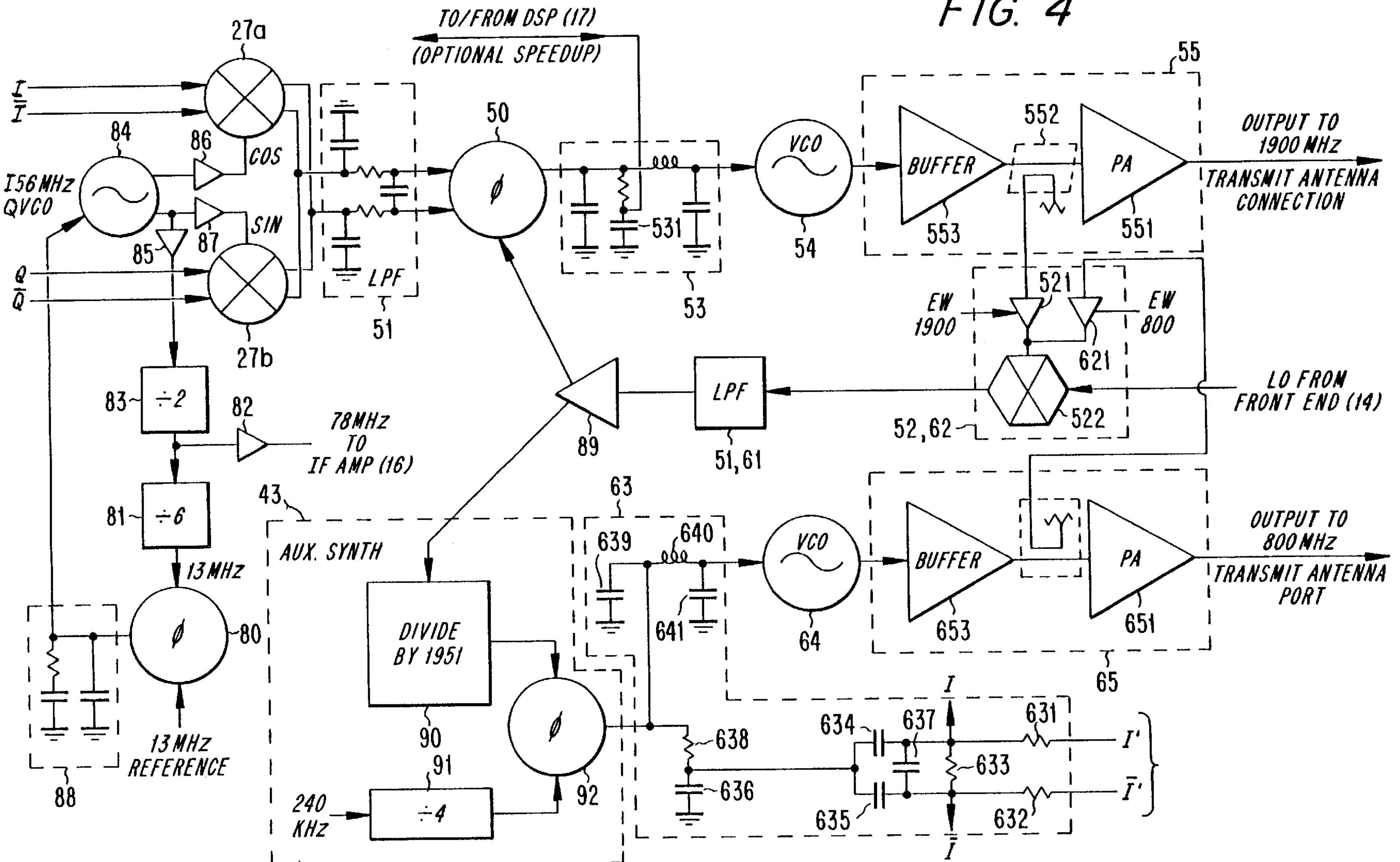
FIG. 4 is a block diagram showing exemplary upconversion circuitry suitable for use in the radiotelephone of FIG. 1.

FIG. 4 shows more detail of the upconversion process from intermediate transmit frequencies TXIF(A) or TXIF (D) to the final transmit frequency Ftx in either the 800 MHz or 1900 MHz bands.

Quadrature modulator 25 (FIG. 2), composed of balanced I-modulator 27*a* and Q-modulator 27*b,* is driven by cosine and sine outputs from Quadrature VCO 84 through buffers 86,87. A buffered output through buffer 85 is also coupled to divide by 12 circuit 81,83 having an intermediate divide by 2 output at 78 MHz coupled through buffer 82 to IF amplifier 16. This 78 MHz output is used in a second downconverting mixer in IF amplifier 16, which is preferably of the image rejection type. An image rejection mixer also requires cosine and sine injection waveforms at 78 MHz, and can be derived easily from the 156 MHz signal by producing a 78 MHz divide-by-2 output delayed by one half cycle of the 156 MHz waveform, as an undelayed output from buffer 82. The extra components for this embodiment are not shown in FIG. 4, but suitable components will be readily apparent to those skilled in the art.

The output of divide by 6 circuit 81 from 78 MHz is at 13 KHz, the same as the reference crystal oscillator signal frequency, with which it is compared in phase comparator 80 having a bipolar current-mirror output. A phase error signal output by comparator 80 is produced in the form of a current proportional to the phase error, which can be low-pass filtered and integrated using purely passive loop filter components 88. The filtered and integrated error signal is fed back to control QVCO 84 to the desired 156 MHz frequency. The loop is preferably a second order servo having a fast lock time that enables rapid power-up and power-down in order to reduce battery consumption by activating the entire QVCO and its control loop only during digital TDMA receive timeslots and digital transmit timeslots, or during analog receive periods. The duty factor during reception of the analog control channel, to which the apparatus listens on standby, may be minimized using known battery saving techniques.

The outputs of modulators 27*a*,27*b* are summed through low-pass filter 51 and applied to phase detector 50, where the GMSK modulated signal is compared with a signal derived from transmit power amplifier 55 by downconversion against the receive local oscillator in mixers 52,62.

FIG. 4 illustrates the previously mentioned inventive feature of combining certain parts common to both frequency bands. Mixers 52,62 have been combined into a single mixer with selection of the signal source by the enable inputs of input buffers 521,621. When transmission in the 1900 MHz band is required, buffer 521 is enabled by a signal EN1900 from DSP 17 to allow a sample of the 1900 MHz transmit signal taken by coupler 552 to pass to the mixer 522. Alternatively the signal EN800 is activated to pass a sample of the 800 MHz signal to mixer 522. The local oscillator from dual-band front end 14 is selected at its source to deliver a signal appropriate to the selected band in order to convert the selected transmit signal frequency to the desired transmit IF TXIF(A) to TXIF(D). The converted signal output is low-pass filtered in combined filter 51,61 and fed by dual-output buffer 81 to both phase detector 50 and auxiliary synthesizer circuit 43 comprising divider 90, reference divider 91 and phase detector 92.

When a 1900 MHz transmit operation is selected, quadrature modulator 25 and phase detector 50 are powered up. Phase detector 50 compares the phase of the modulated TXIF(D) at 156 MHz with the output from buffer 89 to produce a current signal proportional to the phase error. The current is filtered and integrated using only passive filter components 53. Optionally, the phase lock time from power up can be minimized by recording previous voltages on loop filter capacitor 531 at the end of a TDMA burst transmission in a look-up table, versus channel frequency, within DSP/Control processor 17.

The previously digitized and stored voltage value is then recalled, D/A converted, and applied to principal integrator capacitor 531 to precharge the capacitor to approximately the correct voltage just before transmission of a TDMA burst on the same previous frequency, thus reducing relock time. When the loop is locked, the closed-loop bandwidth provided by loop filter 53 is preferably wide enough to cause the phase of the transmit signal sample to be controlled to follow the phase of the GMSK signal from quadrature modulator 25.

When transmission in the 800 MHz band is selected, the output from buffer 89 is divided by 1951 in programmed divider 90 and compared with a 60 KHz reference obtained by further dividing the 240 KHz output of divider 40 by four in divider 91. The comparison of the two 60 KHz signals in phase detector 92 produces an error current signal whose mean value is proportional to the phase error which can be low-pass filtered and integrated using passive loop-filter 63 to obtain a control signal for 800 MHz transmit VCO 64. Passive loop filter 63 includes components 634, 635, 633, 632 and 631 designed to filter a balanced I signal I',$\bar{I}$' from DSP 17 to produce the balanced I,$\bar{I}$ drive signals from modulator 27*a* as well as to filter common mode components of I',$\bar{I}$ with a different filter characteristic for injection into the loop via capacitors 634,635. The arrangement of this filter illustrates the option of using both I and $\bar{I}$ signals to produce analog modulation. In this case, I' and $\bar{I}$' signals from DSP 17 are not complementary signals, but are selected to be the same or to have a sum or mean value representing the desired analog modulation. The phase lock loop filter will pass the modulation signals to VCO 64 causing phase or frequency modulation. The feedback signal from phase detector 92 will tend to counteract this modulation, but this tendency is reduced by divider 90. Nevertheless, the modulation at the lowest modulation frequencies will be partially counteracted, perhaps necessitating boosting the low modulation frequencies prior to D/A conversion in DSP 17. Such a boost combined with other filtering operations in the digital domain in DSP 17 are designed to achieve the overall modulation frequency response desired in analog FM mode, including pre-emphasis.

In one implementation PA 65, oscillator 64 and mixer 62 are constructed as a single unit using a Gallium Arsenide (GaAs) integrated circuit, while 55, 54 and 52 form a second GaAs circuit. Both GaAs circuits may also be combined into a single dual-band GaAs integrated circuit.

In the digital mode, loop filter 53 is preferably designed to obtain a closed loop transfer function broad enough to follow the digital modulation. In the analog mode, loop filter 63 is preferably narrow, so as to prevent the loop from attempting to correct for the impressed analog modulation. Specifically, by tailoring the characteristics with the loop integrating filters 53,63, the desired angle modulation is transferred to the oscillator at the output frequency while suppressing noise at other frequencies and in particular in the receive frequency band. A first loop filter characteristic is employed for AMPS modulation, which has desired modulation components only up to about 10 KHz, while a second loop filter characteristic is employed for a GSM 270.833 KB/S GMSK waveform that has desired components up to 150 KHz. The wider loop filter characteristic in the GSM case allows rapid acquisition of phase lock at the beginning of the TDMA burst such that the VCO accurately tracks the desired angle waveform only a few tens of microseconds after the circuit is enabled. The phase lock circuit may thus be powered down to save power during the receive part of the TDMA frame and powered up just prior to the transmit part of the frame.

The invention can include the use of an analog-to-digital converter to measure the loop filter integrator voltage at the end of a burst and to record the value numerically in a microprocessor memory against the channel frequency. When the same channel frequency is selected later, the voltage value is recalled and applied to a D/A converter to precharge the loop integrator, e.g., during the receive or idle part of the TDMA frame. Just prior to the transmit part of the frame, the D/A connection to the loop integrator capacitor is open-circuited (tri-stated) and the phase error current is used to finely adjust the oscillator control voltage under closed loop control. After transmission, the find-adjusted voltage may be read to overwrite the previous value in memory to provide continuous recalibration. This feature can be used to speed up phase lock acquisition and can also be used in the analog FM mode by recording the loop voltage against frequency eery time the transmitter is operated at any frequency.

Figure 5:
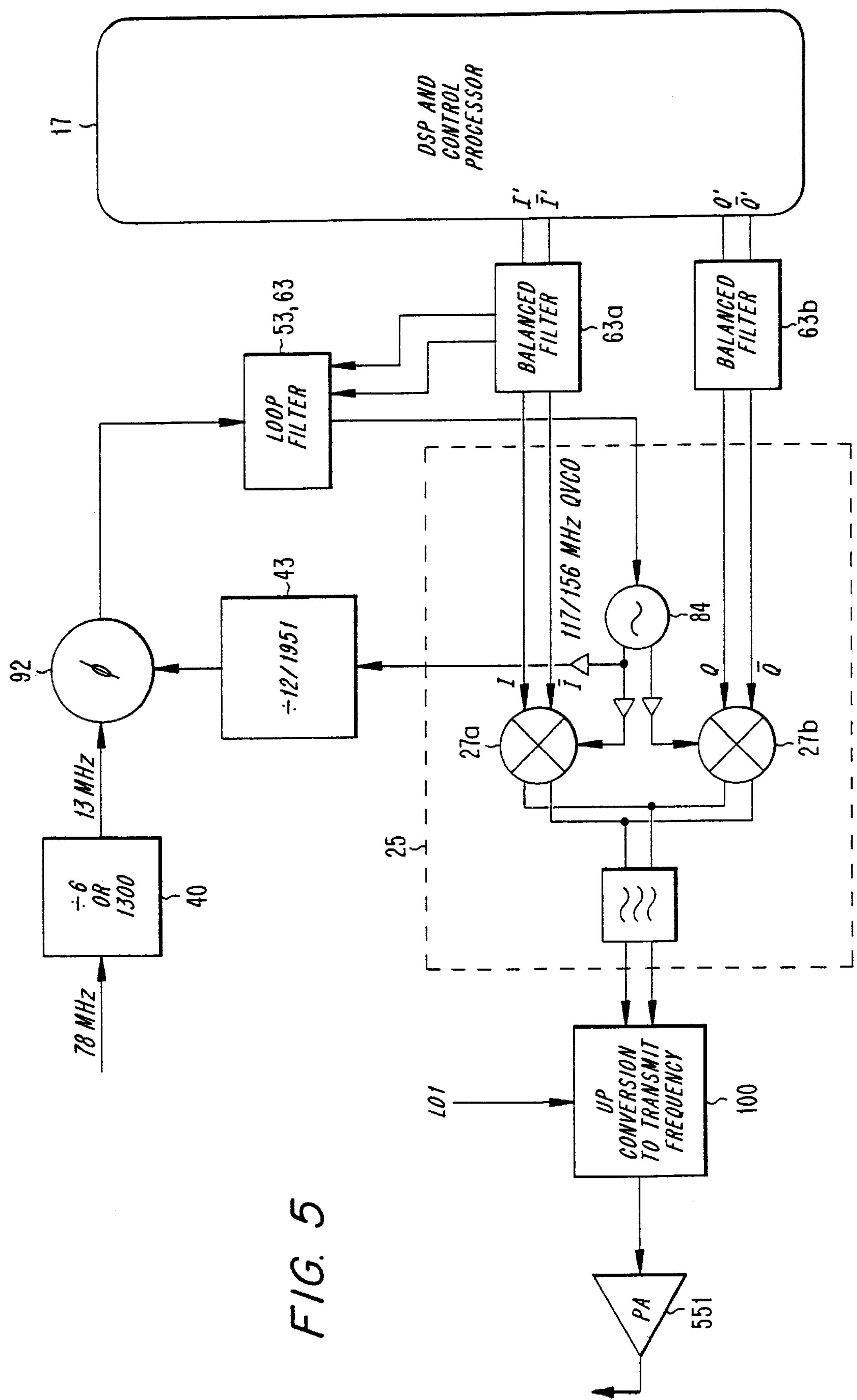
FIG. 5 is a block diagram of an alternative quadrature modulator suitable for use in the radiotelephone of FIG. 1.

An alternative embodiment incorporating the aforementioned Cahill disclosure is shown in FIG. 5. Control processor/DSP 17 in this case produces I',$\bar{I}$' and Q',$\bar{Q}$' signals which are filtered using balanced filter 63*a* to obtain a first balanced, filtered signal I,$\bar{I}$ to drive modulator 27*a,* a second balanced filtered signal Q,$\bar{Q}$ to drive modulator 27*b,* and a common mode filtered signal I" to inject into combined loop filter 53,63. In the digital mode, the common mode signal is suppressed by causing I' and $\bar{I}$' to be generated as complementary signals. In the analog mode, the balanced mode signal is suppressed by generating I' and $\bar{I}$' to be non-inverted signals. This results in modulator 27*a* having nominally no output. The output in the analog mode is caused by supplying constant signals Q,$\bar{Q}$' at their maximum complementary levels to allow the QVCO signal at 117 MHz to pass through Q-modulator 27*b* at the same time the QVCO loop receives an injection of analog modulation from the common mode I',$\overline{I}$' signal. In addition, reference divider 40 and auxiliary divider 43 are programmed to different values depending on whether the digital or analog modulation mode is selected.

An improvement over Cahill may be achieved by programming DSP 17 to generate both analog and I,Q modulation substantially simultaneously. In this mode, high-frequency components of the desired analog modulation are generated in the common mode part of the I',$\overline{I}$' signals and modulate frequency or phase angle inside the QVCO loop. Low frequency components of the desired angle modulation which would otherwise be counteracted by the loop's feedback action are applied outside the loop by generating the balanced part of the I',$\overline{I}$' and Q',$\overline{Q}$' signals to be proportional to the cosine and sine respectively of the desired low-frequency phase modulation signal. In this way, phase modulation down to zero frequency can be obtained. Optionally Q and $\overline{Q}$' can also be fed to loop filter (53,63) and the common-mode part of Q,$\overline{Q}$' can be used together with the common-mode part of I',$\overline{I}$' to provide enhanced accuracy for frequency-modulation VCO 84. In general, the I signal can be generated as a delta-modulation representation of half the sum of a desired balanced (odd mode) and unbalanced (even mode) waveform, while $\overline{I}$' is a delta-modulation representation of half the difference. Likewise, Q and $\overline{Q}$' represent half the sum and half the difference of desired even and odd waveforms.

The selection of division ratios has been previously described. The selection of low division ratios 6 and 12 respectively results in a high loop bandwidth in the digital mode for controlling the frequency of QVCO 84 to 156 MHz. The selection of high division ratios 1300 and 1951 in the analog mode result in a low loop bandwidth for controlling QVCO 84 to 117.06 MHz. By suitably selecting division ratios and designing loop filters 53,63 according to well known techniques, different loop bandwidths may be produced even at the same intermediate transmit frequency (e.g., 117 MHz) in the case that analog and digital modulation was required in the same frequency band, for example for the purpose of implementing the dual-mode phone of U.S application Ser. No. 07/967,027. In that case, the modulation in digital mode is not a pure phase modulation but also includes amplitude modulation, so that upconverter 100 is a linear upconverter to the final transmit frequency, and power amplifier 551 is a linear PA.

The power amplifier requirements for implementing constant amplitude modulations as used in GSM and AMPS are easier than for the varying amplitude modulations used in D-AMPS, therefore it is preferable from a transmitter point of view to combine GSM and AMPS standards into a dual-mode phone. On the other hand, AMPS and GSM use different channel bandwidths and spacings of 30 KHz and 200 KHz respectively. From a receiver point of view it is, according to the prior art, preferable to use the same bandwidth in both modes. The inventive architecture of a dual mode phone disclosed here economically achieves both low cost, dual-band or single band, digital and analog modulation of the transmitter while accommodating both wide and narrow band filtering for reception of GSM, AMPS or D-AMPS respectively.

A further aspect of the present invention provides for facilitating the construction of radio transmitter-receivers, such as digital cellular phones or personal wireless communicators, that operate according to two different standards using non-integrally related bandwidths or bitrates.

In an exemplary implementation, a radio receiver for GSM and AMPS signals includes a reference clock at a frequency of 39 MHz, which is divided by 144 to produce a first sampling rate of 270.833 KS/S, or alternatively divided by 150 to produce a second sampling rate of 260 KS/S. When receiving GSM (digital) signals, the received signals are digitized by any suitable means (Cartesian or Logpolar) using the first sample rate, and when receiving AMPS (analog) radio signals the received signals are digitized using the second sample rate. The analog signal stream sampled at the second (260 KS/S) rate is then digitally filtered to narrow the receiver pass bandwidth to a value adapted to the AMPS mode, and simultaneously the sampling rate is reduced by downsampling to 80 KHz, being a convenient multiple of a 10 KB/S signalling rate used in AMPS and of a standard 8 KS/S speech processing rate for processing sampled and digitized (PCM) speech.

Downsampling in a digital filter is well known when the output sample rate is an integral submultiple of the input sample rate. In certain applications as exemplified above, it can be desirable to produce an output sample rate that is not an integral submultiple of the input rate, i.e. 80:260 or 4:13. The present invention provides a means in general to compute N output samples for every M input samples in a digital downsampling filter.

According to an exemplary embodiment, the inventive method comprises using N digital filters such as FIR filters each having an associated set of filter coefficients adapted to compute one output sample per M input samples. The coefficient are chosen such that the output samples computed by successive filters represent a filtered signal value at N successive time intervals equispaced over each period of M input samples. In an exemplary application, a 260 KS/S input sample rate is applied to four filters, each of which produces an output sample at a 20 KHz rate. The four 20 KHz streams may then be multiplexed to produce an 80 KS/S stream which is further processed to extract 10 KB/S Manchester coded and frequency modulated signalling data or 8 KS/S PCM speech which is then D/A converted using a PCM CODEC circuit to produce an analog speech waveform that is fed to an earpiece.

Many variations to the illustrative embodiments disclosed above will be readily apparent to a person skilled in the art without departing from the spirit and scope of the invention as defined by the following claims and their legal equivalents.

What is claimed is:

1. A radio transmitter/receiver for selectively transmitting digitally modulated signals in a digital mode or analog modulated signals in an analog mode comprising:

digital signal processing means having an input for receiving an information signal, a first output for supplying an In-phase modulating signal I and a second output for supplying a Quadrature modulating signal Q;

quadrature modulation means coupled to the first and second outputs for digitally modulating a carrier frequency in the digital mode to produce a digitally modulated signal; and analog modulation means coupled to the first and second outputs for generating an analog modulation of a carrier frequency in the analog mode to produce an analog modulated signal, wherein said In-phase modulating signal I and said Quadrature modulating signal Q bypass said quadrature modulation means in order to produce said analog modulated signal.

2. The radio transmitter/receiver of claim 1, wherein the digital signal processing means includes logic circuitry for computing a sampled numerical representation of the information signal, D/A conversion means for converting the sampled numerical representation into the In-phase modulating signal I and the Quadrature modulating signal Q.

3. The radio transmitter/receiver of claim 1, wherein the digitally modulated signal is at a first frequency, the analog modulated signal is at a second frequency, and the transmitter further comprises upconversion means for converting the digitally modulated signal to a third frequency and converting the analog modulated signal to a fourth frequency.

4. The radio transmitter/receiver of claim 3, wherein the upconversion means includes digital and analog loop integrating filters which control digital and analog voltage controlled oscillators, respectively, to convert the digital modulated signal to the third frequency and the analog modulated signal to the fourth frequency, while suppressing noise at other frequencies.

5. The radio transmitter/receiver of claim 4, wherein the digital loop integrating filter has a wider transfer function than the analog loop integrating filter.

6. The radio transmitter/receiver of claim 1, wherein the transmitter operates according to the GSM standard in the digital mode, and according to the AMPS standard in the analog mode.

7. The radio transmitter/receiver of claim 1, wherein the digital signal processing means generates the In-phase modulating signal I and the Quadrature modulating signal Q substantially simultaneously.

8. The radio transmitter/receiver of claim 4, wherein the upconversion means further includes means for measuring and storing a loop filter integrator voltage and a corresponding frequency after each received transmission burst, and for precharging one of the loop integrating filters using a previously stored loop filter integrator voltage prior to transmission on a corresponding frequency.

9. The radio transmitter/receiver of claim 1, wherein digitally modulated signals or analog modulated signals are received, and received digitally modulated signals are digitized at a first sampling rate and received analog modulated signals are digitized at a second sampling rate, and digitized analog signals is narrowed, and the second sampling rate is reduced to an output sampling rate.

10. The radio transmitter/receiver of claim 9, wherein the output sampling rate is not an integral submultiple of the second sampling rate.

11. The radio transmitter/receiver of claim 9, wherein there are N digital filters, each having an associated set of filter coefficients for computing one output sample for every M input samples.

12. The radio transmitter/receiver of claim 11, wherein the filter coefficients are chosen such that the output samples computed by successive filters represent a filtered signal value at N successive time intervals equally spaced over each period of M input samples.

13. The radio transmitter/receiver of claim 1, wherein said analog modulation means includes means for selecting or combining said first and second outputs in order to generate a frequency or amplitude modulating signal.

14. A radio transmitter/receiver for selectively transmitting a bandwidth-compressed digital speech signal or an amplitude-compressed analog speech signal comprising:

analog-to-digital conversion means having an input for receiving an analog speech signal and an output for producing a sample stream of numerical samples representative of the analog speech signal;

digital signal processing means having an input for receiving the sample stream and one or more outputs for supplying an In-phase modulating signal I and a Quadrature modulating signal Q, the digital signal processing means converting the sample stream into a bandwidth-compressed and coded digital speech signal and an I and a Q sample stream representative of a digital vector modulation of the bandwidth-compressed digital speech signal or a numerical stream on at least one of the outputs representative of an amplitude-companded version of the analog speech signal;

digital-to-analog conversion means for converting the I and Q sample streams to associated I and Q analog modulating waveforms;

quadrature modulator means coupled to the digital-to-analog conversion means for vector modulating a carrier frequency with the I and Q analog modulating waveforms for transmitting the bandwidth-compressed digital speech signal; and analog modulation means coupled to the digital-to-analog conversion means for producing an analog modulation of a carrier frequency using at least one of the I or Q analog modulating waveforms for transmitting the amplitude-compressed analog speech signal.

15. The radio transmitter/receiver of claim 14, wherein the bandwidth-compressed digital speech signal is at a first frequency, the amplitude-compressed analog speech signal is at a second frequency, and the transmitter further comprises upconversion means for converting the digital speech signal to a third frequency and converting the analog speech signal to a fourth frequency.

16. The radio transmitter/receiver of claim 15, wherein the upconversion means includes digital and analog loop integrating filters which control digital and analog voltage controlled oscillators, respectively, to convert the digital speech signal to the third frequency and the analog speech signal to the fourth frequency, while suppressing noise at other frequencies.

17. The radio transmitter/receiver of claim 16, wherein the digital loop integrating filter has a wider transfer function than the analog loop integrating filter.

18. The radio transmitter/receiver of claim 16, wherein the upconversion means further includes means for measuring and storing a loop filter integrator voltage and a corresponding frequency after each received transmission burst, and for precharging one of the loop integrating filters using a previously stored loop filter integrator voltage prior to transmission on a corresponding frequency.

19. The radio transmitter/receiver of claim 14, wherein the transmitter operates according to the GSM standard for transmitting the digital speech signal, and according to the AMPS standard for transmitting the analog speech signal.

20. The radio transmitter/receiver of claim 14, wherein the digital signal processing means generates the In-phase modulating signal I and the Quadrature modulating signal Q substantially simultaneously.

21. The radio transmitter/receiver of claim 14, wherein digitally modulated signals or analog modulated signals are received, and received digitally modulated signals are digitized at a first sampling rate and received analog modulated signals are digitized at a second sampling rate, and the bandwidth of digitized analog signals is narrowed, and the second sampling rate is reduced to an output sampling rate.

22. The radio transmitter/receiver of claim 21, wherein the output sampling rate is not a integral submultiple of the second sampling rate.

23. The radio transmitter/receiver of claim 22, wherein there are N digital filters, each having an associated set of filter coefficients for computing one output sample for every M input samples.

24. The radio transmitter/receiver of claim 23, wherein the filter coefficients are chosen such that the output samples computed by successive filters represent a filtered signal value at N successive time intervals equally spaced over each period of M input samples.

25. An apparatus for alternatively modulating a carrier signal with an analog signal or a digital signal, comprising:

digital signal processing means for generating a first pair of delta-modulation bitstreams representative of either a balanced In-phase component of a digitally modulated signal or an unbalanced high-frequency component of an analog frequency modulated signal plus an In-phase balanced low-frequency component, and a second pair of delta-modulation bitstreams representative of either a balanced Quadrature component of a digitally modulated signal or a balanced Quadrature low-frequency component of an analog modulation waveform;

Quadrature modulator means, responsive to the balanced In-phase and Quadrature signals, for Quadrature-modulating the carrier signal; and frequency modulation means responsive to the unbalanced high-frequency component for frequency modulating the carrier signal, wherein the carrier signal is either quadrature modulated with a digital modulation signal or frequency or phase modulated with both a low-frequency and a high-frequency component of an analog modulation signal.

26. The apparatus of claim 25, wherein the digital signal processing means generates the In-phase and Quadrature signals substantially simultaneously.

27. A radio transmitter/receiver for selectively transmitting digitally modulated signals in a digital mode or analog modulated signals in an analog mode comprising:

a digital signal processor having an input for receiving an information signal, a first output for supplying an In-phase modulating signal I and a second output for supplying a Quadrature modulating signal Q;

a quadrature modulator coupled to the first and second outputs for digitally modulating a carrier frequency in the digital mode to produce a digitally modulated signal;

a selecting unit coupled to the first and second outputs for selecting said In-phase modulating signal I and said Quadrature modulating signal Q and generating a modulating waveform, or a combining unit coupled to the first and second outputs for combining said In-phase modulating signal I and said Quadrature modulating signal Q and generating a modulating waveform; and an analog modulator for receiving said modulating waveform and producing an analog modulated signal.

28. The radio transmitter/receiver of claim 27, wherein said selecting unit comprises a hardwire connection between said first and second outputs and said analog modulator.

29. The radio transmitter/receiver of claim 27, wherein said combining unit includes a voltage controlled oscillator; and wherein one of said In-phase modulating signal I or said Quadrature modulating signal Q is used to frequency modulate the voltage controlled oscillator while the other signal is injected into a synthesizer loop controlling the voltage controlled oscillator.

30. A method for selectively transmitting digitally modulated signals in a digital mode or analog modulated signals in an analog mode comprising the steps of:

phase receiving an information signal in a digital signal processor and generating an In-phase modulating signal I and a Quadrature modulating signal Q;

determining whether a digital mode or an analog mode has been selected;

digitally modulating, in a quadrature modulator, a carrier frequency to produce a digitally modulated signal if said digital mode has been selected;

selecting, if said analog mode has been selected, an In-phase modulating signal I or a Quadrature modulating signal Q, or combining an In-phase modulating signal I and a Quadrature modulating signal Q, to produce a modulating waveform; and generating, in an analog modulator, an analog modulation of a carrier frequency to produce an analog modulated signal using said modulating waveform if said analog mode has been selected.

31. The method of claim 30, further comprising the step of:

upconverting said digitally modulated signal, if said digital mode has been selected, from a first frequency to a second frequency; and upconverting said analog modulated signal, if said analog mode has been selected, from a third frequency to a fourth frequency.

* * * * *

UNITED STATES PATENT AND TRADEMARK OFFICE
CERTIFICATE OF CORRECTION

PATENT NO. : 6,546,044 B1
DATED : April 8, 2003
INVENTOR(S) : Dent

It is certified that error appears in the above-identified patent and that said Letters Patent is hereby corrected as shown below:

Column 16,
Line 21, should read -- receiving an information signal in a digital signal --

Signed and Sealed this

Ninth Day of December, 2003

JAMES E. ROGAN
*Director of the United States Patent and Trademark Office*